Patented Oct. 5, 1948

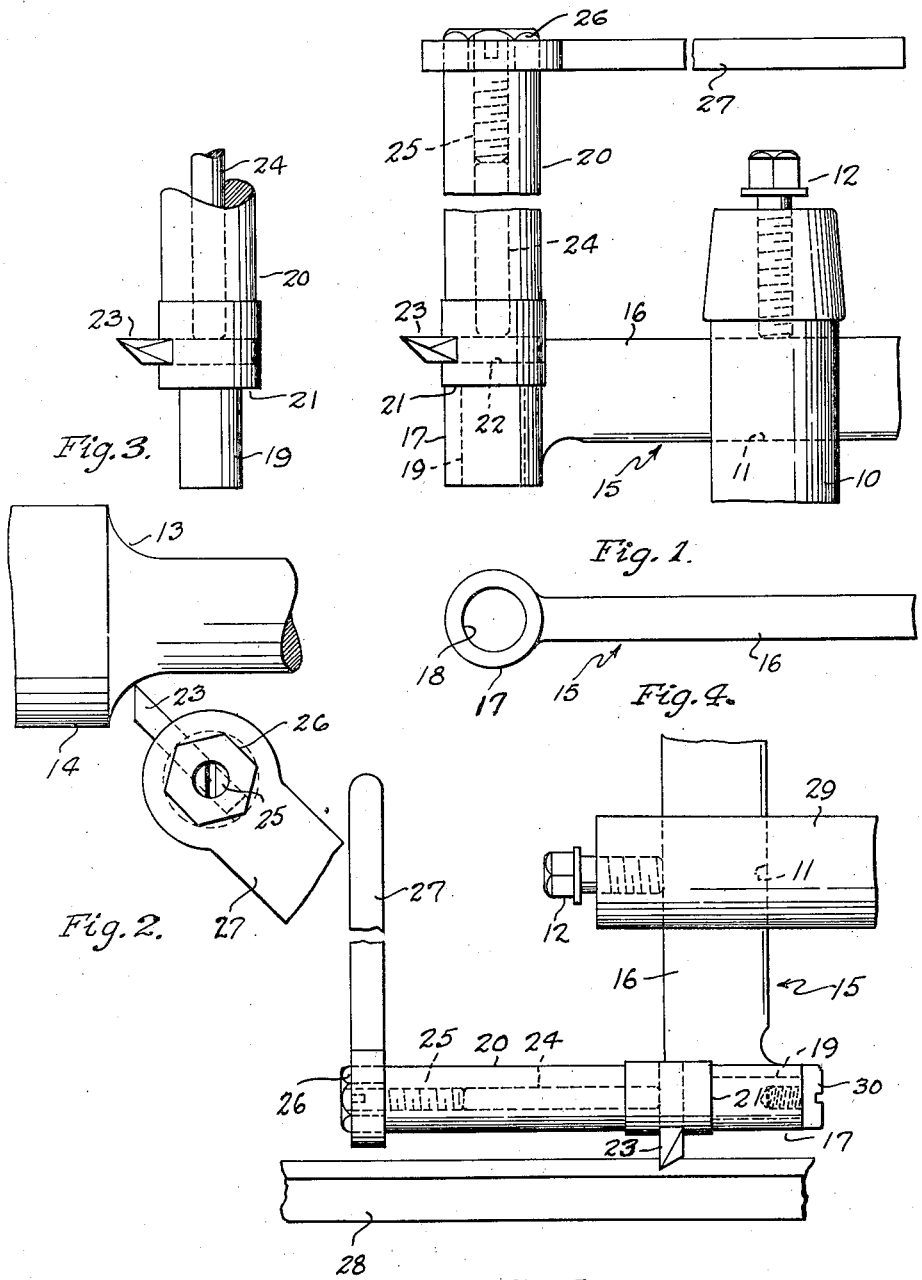

2,450,469

UNITED STATES PATENT OFFICE 2,450,469

RADIUS TOOL

Anthony E. De Martin, Derby, Conn.

Application July 25, 1945, Serial No. 606,923

3 Claims. (Cl. 29—98)

This invention relates to a tool and holder for use on lathes, shapers, planers or other machine tools, and has for an object to provide a simple and effective structure whereby radii may be readily formed on the work pieces with a smoother and more accurate surface than is ordinarily possible with the present form of tools used for this type of work, and one in which the same tool can be used for cutting radii of different sizes.

Another object is to provide such a tool which may be used with these machines without requiring a change in the machine or the tool supporting means.

With the foregoing and other objects in view, I have devised the construction illustrated in the accompanying drawing forming a part of this specification. It is, however, to be understood the device is not limited to the specific details of construction and arrangement shown, but may embody various changes and modifications within the scope of the invention.

In this drawing:

Fig. 1 is a side elevation showing my improved tool mounted in the tool support of a lathe or similar machine;

Fig. 2 is a top plan view of the bit holding portion of the tool showing its use in cutting a radius on a shaft or similar article;

Fig. 3 is a side elevation of the lower portion of the upright shaft member removed from the support;

Fig. 4 is a top plan view of the bar or support for the upright shaft member, and Fig 5 is a side elevation showing how the device may be used in a shaper, planer or similar machine tool to cut straight radii.

In the drawing, 10 is the standard tool post of a lathe or similar machine tool in which may be clamped the shank of a turning or other tool, this post having a transverse opening 11 to receive the shank and in which it is clamped by any suitable means, such as a set screw 12. At the present time a common means for cutting or turning radii on various members, such, for example, as the radius 13 on a shaft 14, is by means of a formed tool the cutting edge of which is formed and ground to the size and shape of the radius. This means a separate and distinct tool, or at least a cutting bit, for each size of radius, and is also objectionable from the working standpoint, because, due to the large surface cut at the one time, it is apt to cause chatter and digging in of the tool, resulting in a very poor, rough surface. The present device cuts the surface progressively, and can be used to make a smaller cut as desired, depending upon the material being worked upon, eliminating the danger of chatter and digging in and producing a perfect surface.

The device comprises a support 15 including the rectangular shank 16 similar to the shank of the standard tool and adapted to be clamped in the tool post 10 in the usual manner. At its forward end it is provided with an upright circular bearing 17 having a cylindrical bearing opening 18 to receive the lower end 19 of an upright shaft member 20. This bearing portion 19 is reduced to a smaller diameter than the body of the shaft 20 to form a shoulder seat 21 resting on the top of the bearing 17 when the shaft is in place. This bearing has a good, rather tight pivot fit in the bearing opening 18 so that, although it may be readily turned about the upright axis, it is not loose or does not turn freely in the bearing, and, therefore, is held accurately in position but may be turned by a suitable means during the cutting operation. This shaft member 20 is provided with a transverse opening 22 to receive the cutting bit or tool 23 which is clamped in position by any suitable means, such as a rod or plug 24, in a vertical central passage in the shaft member and may be clamped against the bit by a suitable set screw 25. The upper end of the shaft member 20 is provided with means for turning it during the operation of cutting the radius. For example, it may have a noncircular, such as a hexagonal, portion 26 to receive a handle or wrench 27 having a similarly shaped opening.

In operation, the tool is clamped in the usual or standard tool post 10 of the lathe or other machine tool with the shaft member 20 carrying the cutting bit 23 mounted with its lower bearing end 19 in the bearing 17, as shown in Fig. 1. The cutting bit 23 may be adjusted in or out to determine the size of the radius surface 13 to be cut and then clamped in this position by means of the set screw 25. During the turning operation of the radius surface 13 the shaft member 20 is slowly turned about its upright axis by means of the wrench or handle 27, thus swinging the point of the cutter bit 23 on an arc about the axis of the member 20 and cutting a perfect radius surface 13, and cutting it progressively with a small cut so as to secure a perfect surface with no chatter or danger of digging in to mar or ruin the surface. The handle is preferably relatively long so as to more readily permit a slow uniform feed of the cutting point of the bit 23 over the curved surface of the radius being finished. It is not limited to cutting an external radius but is equally adapted for cutting an internal radius or a radius in any other desired position.

It is preferred that the bearing portion 17 be offset on the shank 16, as shown in Fig. 1, that is, dropped downwardly below the top of the shank 16. This permits the cutting bit 23 to be located substantially on a line with the top edge of the shank 16 and readily located on substantially the level of the center of the shaft 14 being operated upon, which is the most desirable position. It also permits adjustment of the cutting bit to different heights, because, by merely reversing the support 15 the bearing 17 will be located above the top edge of the shank 16 and the cutting bit therefore will be located considerably higher.

In Fig. 5 is shown how the tool may be used in a shaper, planer or similar type of machine tool for cutting a straight radius on a flat or similar type of work piece 28. In this case the supporting member 15 is merely mounted in the horizontal tool post 29 of the planer or shaper. Thus, in this position the shaft member 20 is in a horizontal position and the cutting bit 23 may be adjusted to the proper position to the work piece 28, and between cutting strokes of the shaper or planer or similar machine may be turned slightly by means of the wrench or handle 27 to turn the cutting point of the bit 23 to progressively cut the radius of the curved surface. It is advisable in this type of device to provide some suitable means of retaining the member 20 in the holder 16 on the return stroke of the machine, such, for example, as the screw 30 threaded into the end of member 20.

It will be seen this tool may be used to cut radii of various sizes by merely adjusting the cutting bit 23, or the supporting shafts 20 or the bits may be made of different sizes. Also it will be seen that the surface of the radius may be cut progressively with small cuts, doing away with the danger of chatter or digging in to mar the surface, as is the common trouble with tools formed with a cutting edge of the size and shape of the radius to be cut. Furthermore, as this tool may be used to cut different radii it does away with the necessity of providing a separate formed tool for each size of radius, all of which are very distinct advantages over the old type of tool.

Having thus set forth the nature of my invention, what I claim is:

1. A tool of the character described comprising a support including a shank so shaped as to be adapted to be mounted and clamped in the tool post of a machine tool and provided with a transversely extending cylindrical bearing at one end, a supporting shaft member provided with a cylindrical bearing portion mounted in the first bearing for turning movements therein and a shoulder to rest on said first bearing, said shaft member being adapted to be reversed in said first bearing, means for mounting a cutting bit in the shaft member for adjustment toward and from the axis of said bearing, the respective ends of the first bearing being at different levels with respect to the adjacent edge of the shank so that when the shaft member is reversed in this bearing the cutting bit will be at a different level with respect to the shank than before the reversal, and a handle for slowly turning said member to swing the cutting end of the bit in an arc about the axis of the bearing during the cutting operation.

2. A tool of the character described comprising a support including a rectangular shank so shaped as to be adapted to be mounted and clamped in the tool post of a machine tool, said shank being provided with a cylindrical bearing at one end extending in the wider plane of the shank and offset so that one end is inwardly of one edge of the shank and the other end is spaced outwardly of the opposite edge of the shank, a shaft member provided with a reduced cylindrical bearing to fit in the first bearing for turning movements with a shoulder resting on one end of the first bearing, said shaft member being provided with means for adjustably mounting a cutting bit to project laterally from said member, said shaft member being reversible so as to be adapted to be mounted in the first bearing with its shoulder resting on either end of the said first bearing to position the bit at different levels with respect to the shank, and means on the shaft member for slowly turning it in said bearing to swing the cutting end of the bit in an arc during the cutting operation.

3. A tool of the character described comprising a support including a rectangular shank so shaped as to be adapted to be mounted and clamped in the tool post of a machine tool, said shank being provided with a cylindrical bearing at one end extending transversely in the plane of the shank and arranged with the opposite ends of the bearing located at different levels with respect to the shank, a shaft member provided with a reduced cylindrical bearing fitted in the first bearing for turning movements therein and providing a shoulder resting against one end of the first bearing, said shaft member being provided with a transverse opening, a cutting bit mounted in said opening for adjustment toward and from the axis of the bearing, means for clamping the bit in adjusted positions, a hand lever, said shaft being reversible in the first bearing so that its shoulder may rest against either end of the first bearing to locate the cutting bit at different levels with respect to the shank, and cooperating means on the shaft member and hand lever to turn the shaft member in the bearing to swing the free end of the bit in an arc during the cutting operation.

ANTHONY E. DE MARTIN.

REFERENCES CITED

The following references are of record in the file of this patent:

UNITED STATES PATENTS

| Number | Name | Date |
|---|---|---|
| 727,440 | Rabinger | May 5, 1903 |
| 867,798 | Collins | Oct. 8, 1907 |
| 1,415,903 | Sheberashenko | May 16, 1922 |
| 1,666,109 | Sheberashenko | Apr. 17, 1928 |
| 1,979,252 | Chedester | Nov. 6, 1934 |